US010169038B2

(12) United States Patent
Gainey, Jr. et al.

(10) Patent No.: US 10,169,038 B2
(45) Date of Patent: *Jan. 1, 2019

(54) COMPARE AND DELAY INSTRUCTIONS

(71) Applicant: INTERNATIONAL BUSINESS MACHINES CORPORATION, Armonk, NY (US)

(72) Inventors: Charles W. Gainey, Jr., Poughkeepsie, NY (US); Dan F. Greiner, San Jose, CA (US); Christian Jacobi, Poughkeepsie, NY (US); Marcel Mitran, Markham (CA); Donald W. Schmidt, Stone Ridge, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,153

(22) Filed: Nov. 26, 2014

(65) Prior Publication Data
US 2015/0261530 A1    Sep. 17, 2015

Related U.S. Application Data

(63) Continuation of application No. 14/212,378, filed on Mar. 14, 2014.

(51) Int. Cl.
*G06F 9/30* (2018.01)
*G06F 9/54* (2006.01)
(Continued)

(52) U.S. Cl.
CPC ........ *G06F 9/30021* (2013.01); *G06F 9/3005* (2013.01); *G06F 9/30029* (2013.01);
(Continued)

(58) Field of Classification Search
CPC ............ G06F 9/30021; G06F 9/30087; G06F 9/30018; G06F 9/30094; G06F 9/30072;
(Continued)

(56) References Cited

U.S. PATENT DOCUMENTS 3,411,147 A    11/1968   Packard
5,440,750 A     8/1995   Kitai et al.
(Continued)

FOREIGN PATENT DOCUMENTS

EP    0863462 A2    9/1998
EP    1612661 A2    1/2006
(Continued)

OTHER PUBLICATIONS

Dan Greiner, "New z/Architecture Instructions that Can Save You Time & Effort", Aug. 2, 2010, IBM.*
(Continued)

*Primary Examiner* — Aimee Li
*Assistant Examiner* — Courtney Carmichael-Moody
(74) *Attorney, Agent, or Firm* — Steven Chiu, Esq.; Blanche E. Schiller, Esq.; Heslin Rothenberg Farley & Mesiti P.C.

(57)    ABSTRACT

A delay facility is provided in which program execution may be delayed until a predefined event occurs, such as a comparison of memory locations results in a true condition, a timeout is reached, an interruption is made pending or another condition exists. The delay facility includes one or more compare and delay machine instructions used to delay execution. The one or more compare and delay instructions may include a 32-bit compare and delay (CAD) instruction and a 64-bit compare and delay (CADG) instruction.

11 Claims, 21 Drawing Sheets

(51) Int. Cl.
*G06F 9/38* (2018.01)
*G06F 9/455* (2018.01)

(52) U.S. Cl.
CPC ...... *G06F 9/30065* (2013.01); *G06F 9/30072* (2013.01); *G06F 9/30079* (2013.01); *G06F 9/30087* (2013.01); *G06F 9/3851* (2013.01); *G06F 9/542* (2013.01); *G06F 9/455* (2013.01)

(58) Field of Classification Search
CPC ... G06F 9/30065; G06F 9/3009; G06F 9/3851
See application file for complete search history.

(56) References Cited

U.S. PATENT DOCUMENTS

| | | | |
|---|---|---|---|
| 5,471,593 A * | 11/1995 | Branigin | G06F 9/30018 712/219 |
| 5,551,013 A | 8/1996 | Beausoleil et al. | |
| 5,574,873 A | 11/1996 | Davidian | |
| 5,790,825 A | 8/1998 | Traut | |
| 6,009,261 A | 12/1999 | Scalzi et al. | |
| 6,079,008 A * | 6/2000 | Clery, III | G06F 9/30087 712/11 |
| 6,308,255 B1 | 10/2001 | Gorishek, IV et al. | |
| 6,463,582 B1 | 10/2002 | Lethin et al. | |
| 8,195,924 B2 | 6/2012 | Alexander et al. | |
| 8,621,183 B2 | 12/2013 | Hohmuth | |
| 9,146,844 B2 | 9/2015 | Breternitz | |
| 2004/0123073 A1 | 6/2004 | Tomescu et al. | |
| 2005/0177705 A1* | 8/2005 | Col | G06F 9/30018 712/221 |
| 2005/0235134 A1 | 10/2005 | O'Sullivan | |
| 2007/0067607 A1* | 3/2007 | Jiao | G06F 9/3885 712/215 |
| 2009/0172299 A1 | 7/2009 | Goodman | |
| 2009/0182988 A1 | 7/2009 | Greiner et al. | |
| 2009/0300643 A1 | 12/2009 | Gove et al. | |
| 2010/0100688 A1 | 4/2010 | Harper et al. | |
| 2010/0332766 A1 | 12/2010 | Zeffer | |
| 2011/0209151 A1 | 8/2011 | Chung et al. | |
| 2012/0079245 A1 | 3/2012 | Wang | |
| 2012/0079246 A1 | 3/2012 | Breternitz | |
| 2013/0232499 A1 | 9/2013 | Saha | |
| 2013/0339676 A1 | 12/2013 | Greiner et al. | |
| 2015/0261529 A1 | 9/2015 | Gainey, Jr. | |
| 2015/0261531 A1 | 9/2015 | Gainey, Jr. | |
| 2015/0261532 A1 | 9/2015 | Gainey, Jr. | |
| 2015/0261539 A1 | 9/2015 | Gainey, Jr. | |
| 2015/0261540 A1 | 9/2015 | Gainey, Jr. | |
| 2016/0342416 A1 | 11/2016 | Greiner et al. | |
| 2017/0132005 A1 | 5/2017 | Greiner et al. | |
| 2017/0139711 A1 | 5/2017 | Greiner et al. | |

FOREIGN PATENT DOCUMENTS

| | | |
|---|---|---|
| WO | WO2009087158 A2 | 7/2009 |
| WO | WO2013186721 A2 | 12/2013 |

OTHER PUBLICATIONS

"Z/Architecture—Principles of Operation," IBM Publication No. SA22-7832-09, 10th Edition, Sep. 2012, pp. 1-1568.

Mell, Peter and Tim Grance, "The NIST Definition of Cloud Computing," National Institute of Standards and Technology, Information Technology Laboratory, Version 15, Oct. 7, 2009, pp. 1-2.

"Power ISA™ Version 2.06 Revision B," International Business Machines Corporation, Jul. 23, 2010, pp. 1-1341.

"Intel® 64 and IA-32 Architectures Developer's Manual: vol. 2B, Instructions Set Reference, A-L," Order No. 253666-045US, Jan. 2013, pp. 1-524.

"Intel® 64 and IA-32 Architectures Developer's Manual: vol. 2B, Instructions Set Reference, M-Z," Order No. 253667-045US, Jan. 2013, pp. 1-550.

International Search Report and Written Opinion for PCT/EP2015/055016 dated May 27, 2015, pp. 1-16.

International Search Report and Written Opinion for PCT/EP2015/053715 dated May 27, 2015, pp. 1-15.

International Search Report and Written Opinion for PCT/EP2015/053716 dated Jun. 1, 2015, pp. 1-16.

Keckler, S.W. et al., "Exploiting Fine-Grain Thread Level Parallelism on the MIT Multi-ALU Processor," Proceedings of the 25th Annual International Symposium on Computer Architecture, Jun. 1998, pp. 1-12.

Office Action for U.S. Appl. No. 14/212,378 dated Mar. 9, 2016, pp. 1-22.

Office Action for U.S. Appl. No. 14/212,194 dated Apr. 7, 2016, pp. 1-20.

Office Action for U.S. Appl. No. 14/554,217 dated Apr. 20, 2016, pp. 1-24.

Notice of Allowance for U.S. Appl. No. 14/212,004 dated May 3, 2016, pp. 1-17.

Notice of Allowance for U.S. Appl. No. 14/554,090 dated May 3, 2016, pp. 1-16.

Final Office Action for U.S. Appl. No. 14/212,378 dated Jun. 29, 2016, pp. 1-21.

Office Action for U.S. Appl. No. 14/212,378 dated Dec. 13, 2016, pp. 1-24.

Final Office Action for U.S. Appl. No. 14/212,378 dated May 5, 2017, pp. 1-32.

IBM, "z/Architecture—Principles of Operation," SA22-7832-07, Eighth Edition, Feb. 2009, pp. 2-2, 4-5, 7-3, 7-136 thru 7-138, 10-1 thru 10-2.

Notice of Allowance for U.S. Appl. No. 14/212,378 dated Jan. 23, 2018, pp. 1-22.

Office Action for U.S. Appl. No. 15/228,067 dated Aug. 23, 2017, pp. 1-20.

Office Action for U.S. Appl. No. 15/406,147 dated Feb. 13, 2018, pp. 1-31.

\* cited by examiner

COMPARE AND DELAY INSTRUCTIONS

CROSS-REFERENCE TO RELATED APPLICATIONS

This application is a continuation of co-pending U.S. patent application Ser. No. 14/212,378, filed Mar. 14, 2014, entitled "COMPARE AND DELAY INSTRUCTIONS," which is hereby incorporated herein by reference in its entirety.

BACKGROUND

One or more aspects relate, in general, to multiprocessing computing environments, and in particular, to controlling program execution within such computing environments.

In multiprocessing computing environments, such as symmetric multiprocessing (SMP) environments, multiple processors of the SMP environment use classic synchronization mechanisms to synchronize execution within the environment. These synchronization mechanisms include serialization techniques implemented in shared memory locations and may include semaphores or other shared memory flags or counters. In order to ensure progress, such mechanisms may also include additional code to limit the time spent waiting for a synchronization signal. The limits may include a simple instruction counter, a time-based mechanism, or other technique.

Other multiprocessing environments, such as simultaneous multithreading (SMT) environments, may use the above techniques or other techniques to synchronize execution.

SUMMARY

Shortcomings of the prior art are overcome and advantages are provided through the provision of a method of executing a machine instruction in a computing environment. The method includes, for instance, obtaining, by a processor, a machine instruction for execution, the machine instruction being defined for computer execution according to a computer architecture, the machine instruction including: an operation code to specify a compare and delay operation; one or more first fields to be used to obtain a first operand; and one or more second fields to be used to obtain a second operand; and executing, by the processor, the machine instruction, the executing including: comparing the first operand and the second operand to obtain a comparison result; determining whether a mask indicator corresponding to the comparison result is set to a defined value; and based on determining that the mask indicator corresponding to the comparison result is set to the defined value, delaying completion of the machine instruction until occurrence of a predefined event.

Computer program products and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one aspect, a capability is provided to delay program execution until a predefined event occurs, such as a comparison of memory locations results in a true condition, a timeout is reached, an interruption is made pending or another condition exists. This capability includes, for instance, a delay facility having one or more Compare and Delay machine instructions used to delay execution.

Figure 1A:
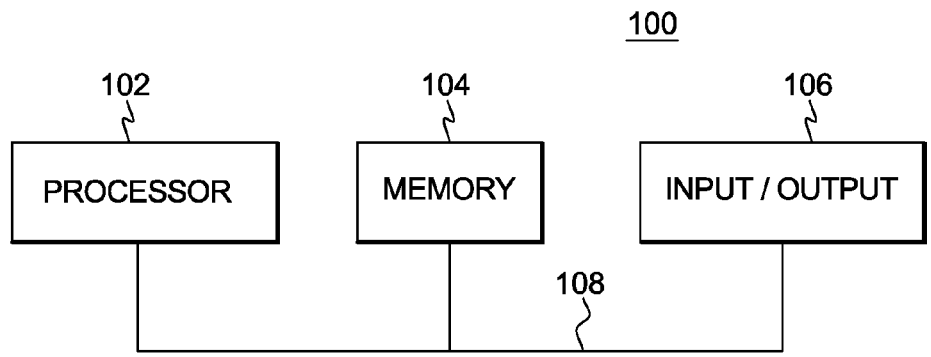
FIG. 1A depicts one embodiment of a computing environment.

One embodiment of a computing environment to incorporate and use one or more aspects of the delay facility is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-09, Tenth Edition, September, 2012, which is hereby incorporated by reference herein in its entirety. In one example, the processor executes an operating system, such as z/OS, also offered by International Business Machines Corporation. IBM®, Z/ARCHITECTURE® and Z/OS® (as well as Z/VM® referenced below) are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.06 Revision B," International Business Machines Corporation, Jul. 23, 2010, which is hereby incorporated by reference herein in its entirety. POWER ARCHITECTURE® is a registered trademark of International Business Machines Corporation, Armonk, N.Y.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated by reference herein in its entirety. Intel® is a registered trademark of Intel Corporation, Santa Clara, Calif.

Figure 1B:
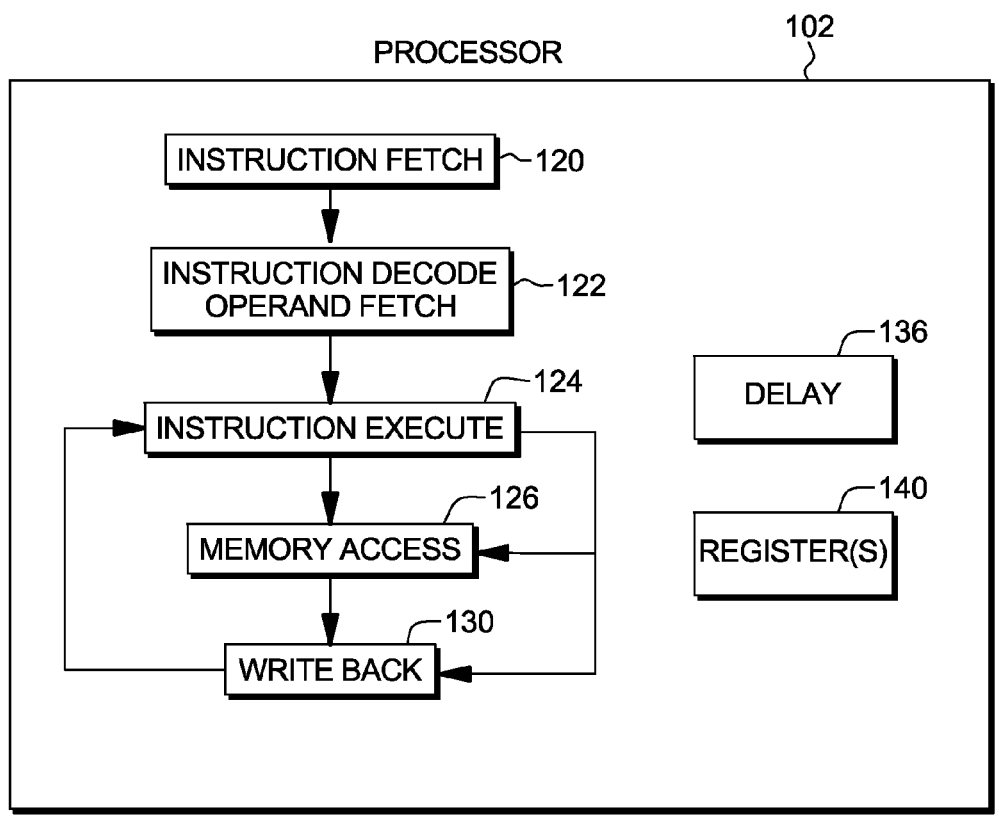
FIG. 1B depicts further details of the processor of FIG. 1A.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect, provide delay functionality by including at least a portion of or having access to a delay component 136. This functionality is described in further detail below.

Processor 102 also includes, in one embodiment, one or more registers 140 to be used by one or more of the functional components.

Another embodiment of a computing environment to incorporate and use one or more aspects of the delay facility, including the Compare and Delay instructions, is described with reference to FIG. 2.

Figure 2:
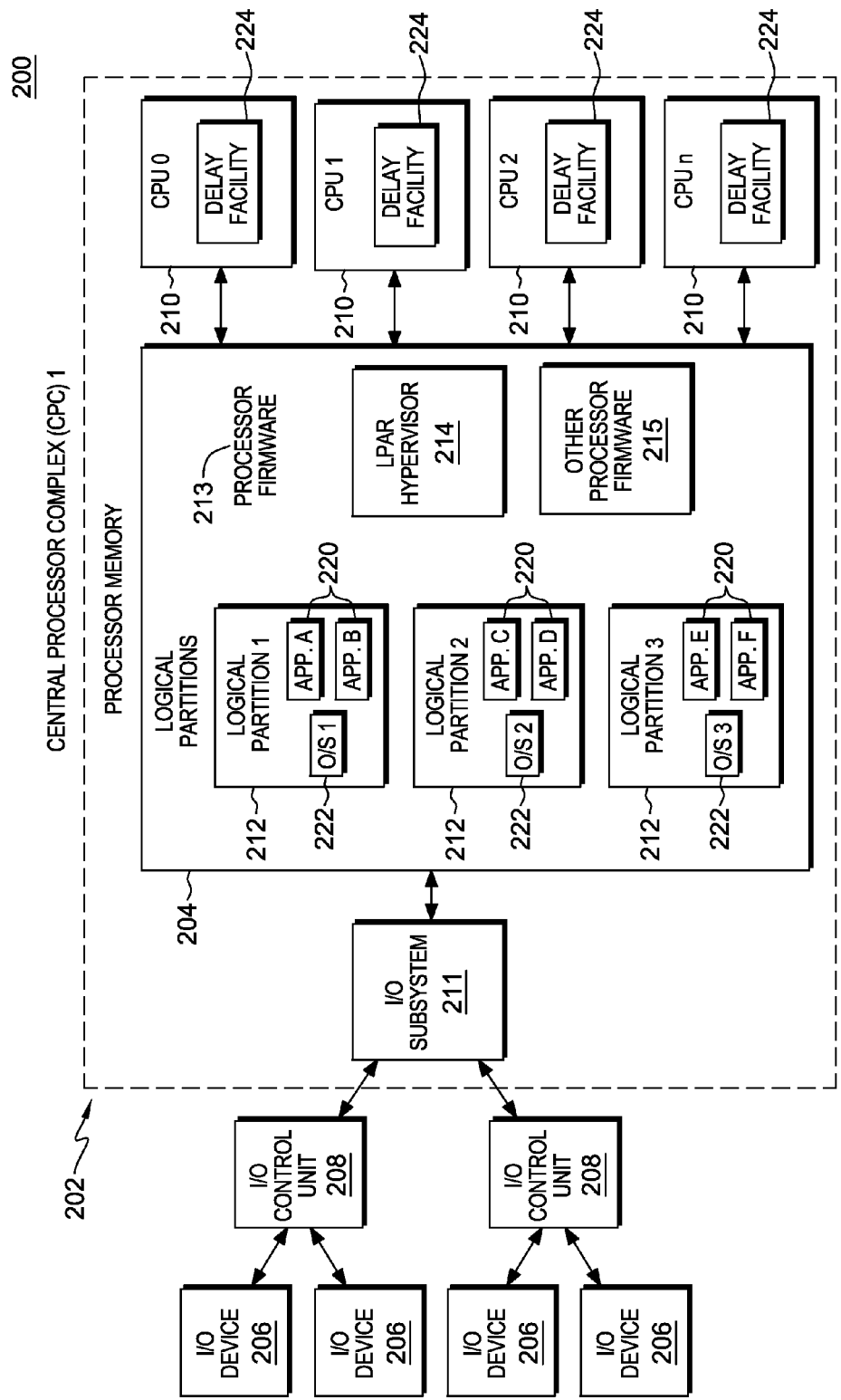
FIG. 2 depicts another example of a computing environment.

Referring to FIG. 2, in one example, a computing environment 200 is based on the z/Architecture, offered by International Business Machines (IBM®) Corporation, Armonk, N.Y. Computing environment 200 includes, for example, a central processor complex (CPC) 202 coupled to one or more input/output (I/O) devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PR/SM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition. In one example, one or more of the CPUs include aspects of the delay facility 224 described herein.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
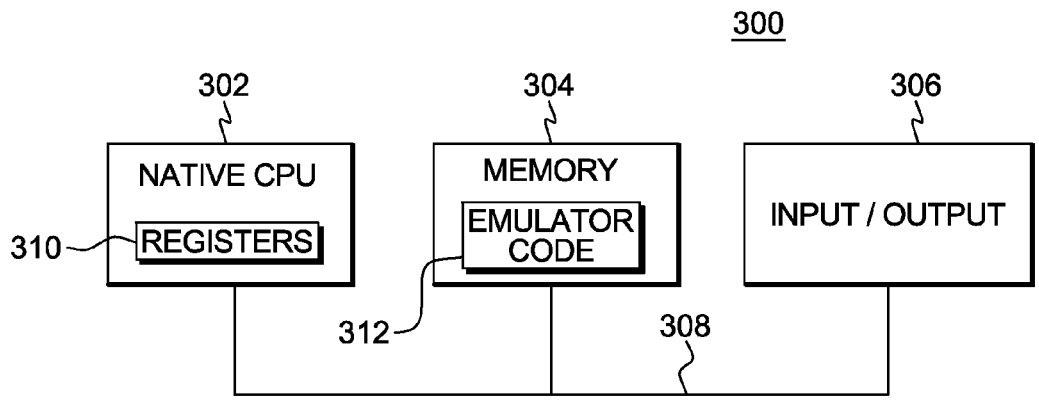
FIG. 3A depicts yet another example of a computing environment.

Another embodiment of a computing environment to incorporate and use one or more aspects of the delay facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represent the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 3B:
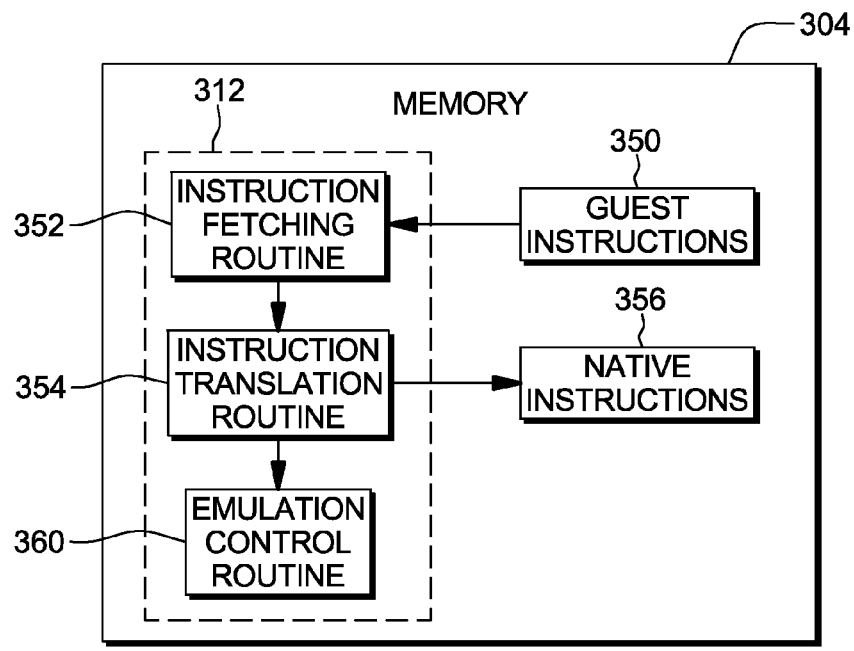
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include a delay facility used to delay program execution. The embodiments described herein are for the z/Architecture, however, other architectures may incorporate and use the delay facility, including the COMPARE AND DELAY instructions described herein. The embodiments described herein are not meant to be limiting in any way.

In accordance with one or more aspects, the delay facility is installed when a facility indication bit of the z/Architecture, e.g., bit 128, is set to, for instance, one. Further, a control register (e.g., CR 2) may be used to control which entities (e.g., operating system, application programming, etc.) within the environment may use the delay facility. For instance, if a selected bit, e.g., bit 60, of CR 2 is set to, for instance, one, then the COMPARE AND DELAY instructions that are part of the delay facility are authorized to execute in a problem state (e.g., a non-privileged state), when the processor is not in the supervisor state (e.g., privileged state).

In one embodiment, the delay facility includes two instructions: a 32-bit COMPARE AND DELAY instruction (CAD), and a 64-bit COMPARE AND DELAY instruction (CADG), each of which is described below.

Figure 4A:
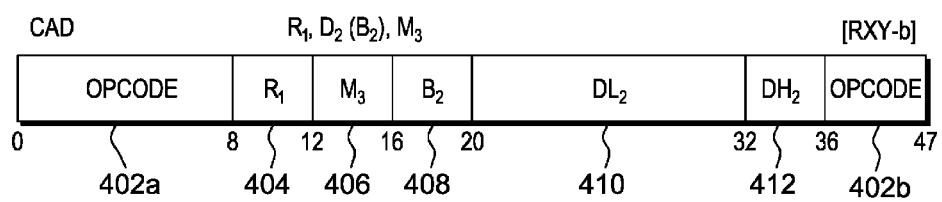
FIG. 4A depicts one example of a Compare and Delay (CAD) instruction.
Figure 4B:
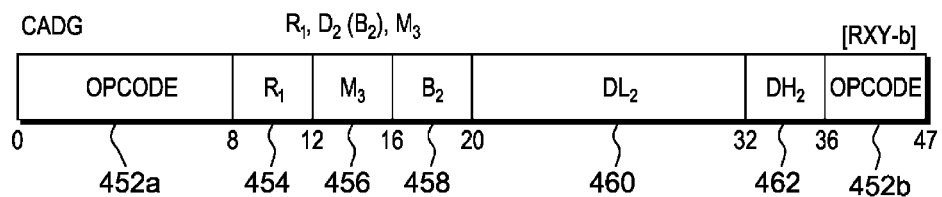
FIG. 4B depicts another example of a Compare and Delay (CADG) instruction.

One embodiment of a format of the 32-bit COMPARE AND DELAY instruction is described with reference to FIG. 4A. As one example, a COMPARE AND DELAY (CAD) instruction 400 includes a plurality of opcode fields 402a, 402b specifying an opcode that designates a compare and delay operation; a register field ($R_1$) 404 that specifies a register, the contents of which include the first operand; a mask field ($M_3$) 406; a base field ($B_2$) 408; a first displacement field ($DL_2$) 410; and a second displacement field ($DH_2$) 412. The contents of the general register designated by the $B_2$ field are added to the contents of a concatenation of the $DH_2$ and $DL_2$ fields to form the second operand address used to obtain the second operand. The first and second operands are 32-bit signed binary integers. The first operand is located in, for instance, bit positions 32-63 of general register $R_1$. The second operand is, for instance, a word in storage.

In another embodiment, a 64-bit COMPARE AND DELAY (CADG) instruction 450 is provided, which includes a plurality of opcode fields 452a, 452b specifying an opcode that designates a compare and delay operation; a register field ($R_1$) 454 that specifies a register, the contents of which include the first operand; a mask field ($M_3$) 456; a base field ($B_2$) 458; a first displacement field ($DL_2$) 460; and a second displacement field ($DH_2$) 462. The contents of the general register designated by the $B_2$ field are added to the contents of a concatenation of the $DH_2$ and $DL_2$ fields to form the second operand address used to obtain the second operand. In this instance, the first and second operands are 64-bit signed binary integers. The first operand is located in, for instance, bit positions 0-63 of general register $R_1$. The second operand is a doubleword in storage.

In operation, regardless of the format of the COMPARE AND DELAY instruction, the first operand is compared with the second operand. If a mask bit in, for instance, bit positions 0-2 of the $M_3$ field corresponding to the comparison result is one, completion of the instruction is delayed; otherwise, execution of the instruction completes. If the instruction is completed, the resulting condition code is determined from the most recent operand comparison.

During the delay, the instruction ends for any of the following reasons, whichever occurs first:

The relationship of the operand values resulting in the delay is no longer represented by a bit position in the $M_3$ field whose value is one. In this case, the instruction is completed.

An enabled interruption is made pending. In this case, the instruction may be either nullified (instruction execution is not advanced but returns to same instruction) or completed (instruction execution is advanced to next instruction).

A model-dependent time limit is reached. The limit does not exceed approximately one millisecond, in this example. In this case, the instruction is completed.

A model-dependent CPU-determined reason is recognized. In this case, the instruction may be nullified or completed.

The second operand may be fetched multiple times during the delay. Each fetch of the second operand is preceded by a specific-operand serialization. Each fetch of the second operand is block-concurrent.

When multiple stores to the second operand by another CPU or the I/O subsystem occur in quick succession while the Compare and Delay instruction is delaying, a comparison by the instruction against one or more of the earlier stored values may or may not occur.

One example of the comparison results and corresponding $M_3$ bits are as follows:

| Comparison Result | $M_3$ Bit |
|---|---|
| Equal | 0 |
| First operand low | 1 |
| First operand high | 2 |

Bit 3 of the $M_3$ field is reserved and should be zero; otherwise, the program may not operate compatibly in the future.

Special Conditions

The second operand is to be on an integral boundary corresponding to its size, otherwise a specification exception is recognized.

In problem state, when bit 60 of control register 2 is zero, a privileged-operation exception is recognized.

Resulting Condition Code:
0 Operands equal
1 First operand low
2 First operand high
3 --

Program Exceptions:
Access (fetch, second operand)
Operation exception (if the delay facility is not installed)
Privileged operation
Specification
Transaction Constraint Programming Notes:
1. When bit positions 0-2 of the $M_3$ field contain zeros, the instruction does not cause a delay. When bit positions 0-2 of the $M_3$ field contain 111 binary, a delay occurs.
2. Upon completion of COMPARE AND DELAY, it is not guaranteed that the comparison indicated by the condition code is still true due to a store from another CPU or the I/O subsystem.
3. Depending on the requirements of the program, it may be necessary to verify the value of the second operand again before changing it, such as with a COMPARE AND SWAP instruction.

Figure 5A:
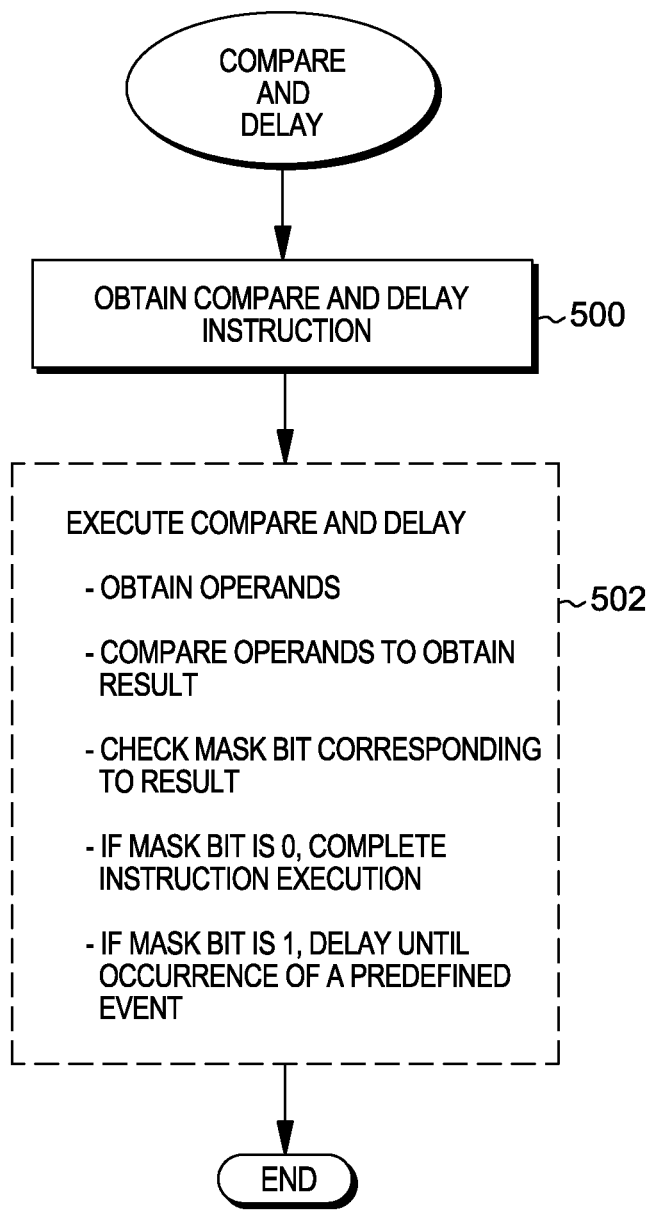
FIGS. 5A-5B depict one embodiment of the logic associated with the Compare and Delay instructions of FIGS. 4A-4B.
Figure 5B:
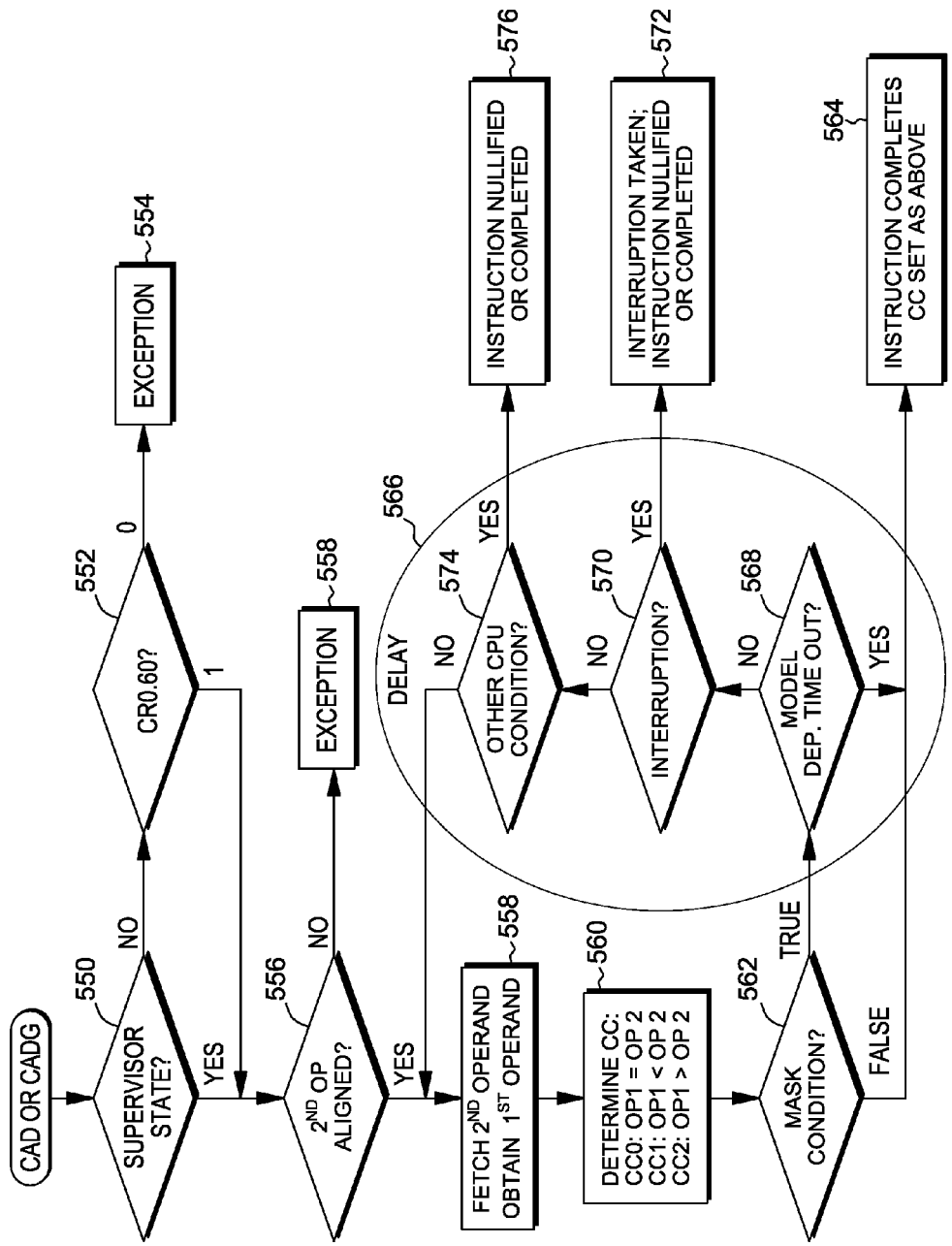

Further details regarding processing of the COMPARE AND DELAY instructions are described with reference to FIGS. 5A-5B. Referring to FIG. 5A, in one embodiment, a processor obtains (e.g., fetches, receives, is provided, or otherwise gets) a COMPARE AND DELAY instruction (CAD or CADG), STEP 500, and executes the same, STEP 502. In execution, the first operand is obtained from the register and the second operand is fetched from memory. The first operand is, for instance, pre-loaded by the program based on what the program would like to delay for (e.g., counter reaching a particular value, etc.). The second operand is stored, for instance, by another processor or an I/O subsystem, as examples.

The operands are compared providing a comparison result, which is either equal, operand 1 is less than operand 2 (a.k.a., first operand low), or operand 1 is greater than operand 2 (a.k.a., first operand high). The mask bit in bit positions 0-2 of the $M_3$ field corresponding to the comparison result is checked. For instance, if the comparison result is equal, then the value of bit 0 in $M_3$ is checked; if the comparison result is the first operand is less than the second operand, then bit 1 in $M_3$ is checked; and if the comparison result is the first operand is greater than the second operand, then bit 2 in $M_3$ is checked.

If the value of the checked bit is set to zero, then the instruction completes, and processing of the COMPARE AND DELAY instruction ends. However, if the mask bit corresponding to the comparison result is set equal to one, then the instruction is delayed, e.g., until a predefined event occurs.

Further details regarding execution of a COMPARE AND DELAY instruction by the processor that obtained the instruction are described with reference to FIG. 5B. Initially, a determination is made as to whether the processor executing the COMPARE AND DELAY instruction (CAD or CADG) is in the supervisor state, INQUIRY 550. If the processor is not in the supervisor state, then a further determination is made as to whether a selected bit, e.g., bit 60, in a selected control register, e.g., control register 0, is set indicating that this instruction is authorized to be executed in the problem state, INQUIRY 552. If bit 60 of control register 0 is set to zero, then the instruction is not authorized to be executed in the problem state, and an exception is provided indicating a privileged operation exception, STEP 554. However, if bit 60 of control register 0 is set to one indicating that the instruction is authorized to execute in the problem state, then processing continues with INQUIRY 556. Similarly, if the processor is in the supervisor state, INQUIRY 550, then processing continues with INQUIRY 556.

At INQUIRY 556, a determination is made as to whether the second operand is correctly aligned, INQUIRY 556. For instance, a determination is made for the CAD instruction of whether the second operand is on a 4-byte boundary, and for the CADG instruction, a determination is made as to whether the second operand is on an 8-byte boundary. If the second operand is not aligned correctly, then a specification exception is provided, STEP 558. However, if the second operand is aligned correctly, then the second operand is fetched from memory, STEP 560. Additionally, the first operand is obtained from the selected register.

Next, in one embodiment, a condition code is determined by comparing the first operand and the second operand, STEP 560. In this particular example, if the two operands (OP1 and OP2) are equal, then the condition code (CC) is set to zero; if operand 1 is less than operand 2, then the condition code is set to 1; and if operand 1 is greater than operand 2, then the condition code is set equal to 2. The condition code represents a result of the comparison and such result is used to select the mask bit of $M_3$ to be checked.

The mask bit corresponding to the comparison result is checked, and a determination is made as to whether a mask condition is true or false, INQUIRY 562. In one example, the mask condition is true, if bit zero of $M_3$ is 1 and CC equals zero; or bit 1 of $M_3$ is 1 and CC equals 1; or bit 2 of $M_3$ is 1 and CC equals 2. That is, the mask condition is true if the mask bit in bit positions 0-2 of the $M_3$ field corresponding to the comparison result (e.g., equal, less than, greater than) is 1. If the mask condition is false, then the instruction completes, and the condition code is set from the most recent operand comparison, STEP 564.

Returning to INQUIRY 562, if the mask condition is true, then completion of the instruction is delayed, STEP 566. In one example, the instruction is delayed until a predefined event occurs. Thus, in one example, to determine whether the delay is to continue or end, a determination is made as to whether a model dependent timeout has been reached, INQUIRY 568. If so, then the instruction completes, and the condition code is set based on the most recent operand comparison, STEP 564. However, if the model dependent timeout has not been reached, then a further determination is made as to whether an enabled interruption has been made pending, INQUIRY 570. If an enabled interruption has been made pending, then the interruption is taken, and the instruction is nullified or completed, STEP 572. If the instruction completes, the condition code is set based on the most recent operand comparison. Returning to INQUIRY 570, if there is no interruption, then a further determination is made as to whether there is another CPU condition that is to end the delay (e.g., a machine condition or other event), INQUIRY 574. If so, then the instruction is nullified or completed, STEP 576. Again, if the instruction is completed, the condition code is set based on the most recent operand comparison. However, if there is no other CPU condition to end the delay, then processing continues with re-fetching the second operand, STEP 558. That is, the delay continues. As indicated herein, the delay continues until, for instance, one of the following events occurs, which are not in any particular order:

The relationship of the operand values resulting in the delay is no longer represented by a bit position in the $M_3$ field whose value is 1;
An enabled interruption is made pending;
A model dependent time limit is reached; or
A model dependent CPU determined condition is recognized.

Although the above refers to a time limit, any other limit may be used.

Described in detail above is a delay facility including COMPARE AND DELAY instructions used to delay program execution until a defined event occurs. This may be used, for instance, by one CPU to make sure it is in synchronization with a signal from another CPU. These instructions and facility may be used by an operating system dispatcher to make sure that microfine dispatching algorithms are quickly kept in synchronization or for other types of control. There may be different types of uses. In further embodiments, programs other than the operating system may also use the delay facility including one or more of the delay instructions.

In one aspect, the delay facility provides a high resolution means of synchronized execution of CPUs (also referred to as threads) of, for example, an SMT environment to implement efficient dispatching of the CPUs. This facility provides efficient use of processor resources in providing the delay. In one example, in a multithreading environments, while a thread is delayed (i.e., making no productive use of the processor), another thread can be dispatched on the processor and make progress.

Aspects of the delay facility are used by multiprocessing environments, where the progress of a particular instruction stream is to be synchronized with another instruction stream. By using a commonly accessible location in memory as a gating indication, a processor can be temporarily delayed until, for instance, another processor updates the shared location or until a model-dependent time period has elapsed. The program is alerted to which reason ended the delay by means of a condition code.

Figure 6A:
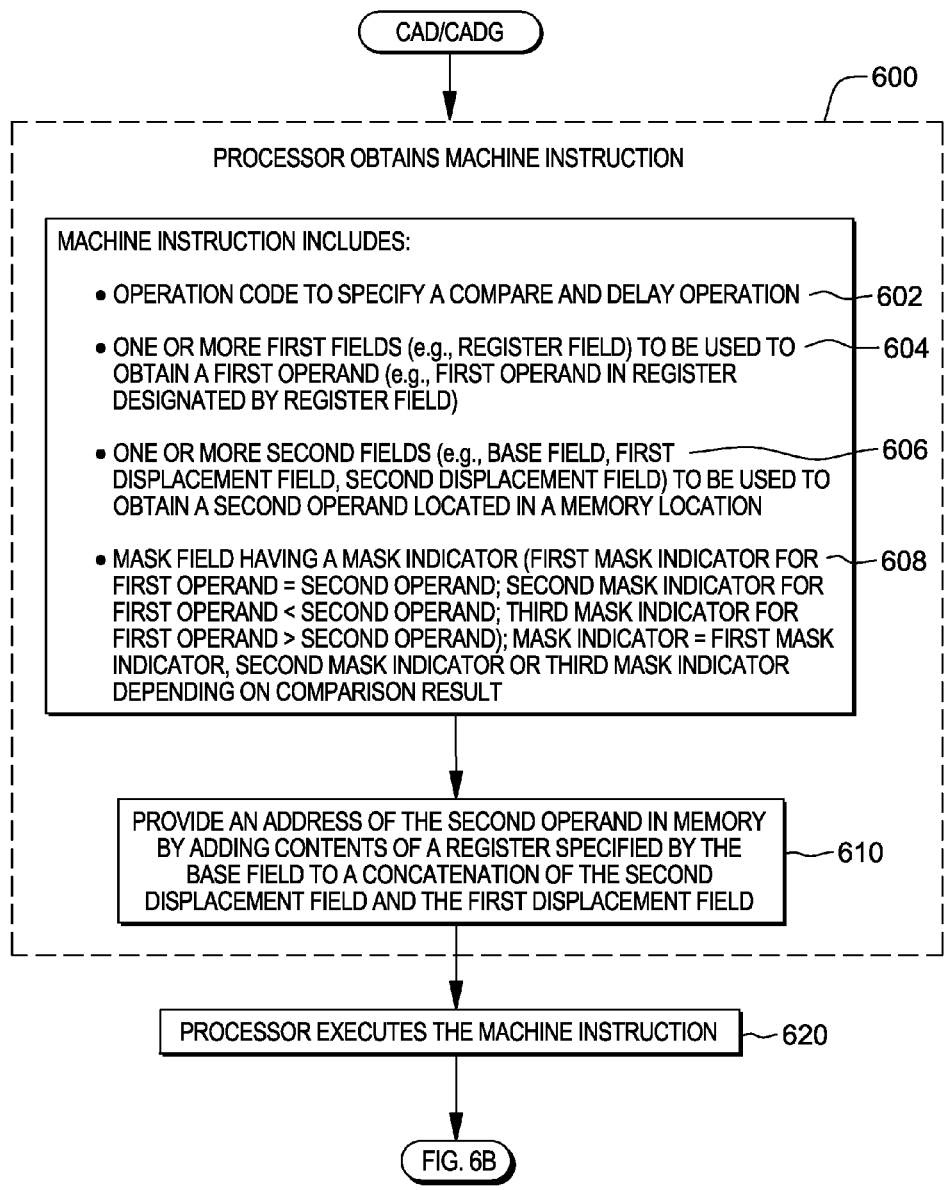
FIGS. 6A-6C depict another embodiment of processing associated with aspects of the Compare and Delay instructions of FIGS. 4A-4B.

In addition to the above, aspects of the delay facility are described with reference to FIGS. 6A-6C. Referring initially to FIG. 6A, a processor obtains a machine instruction, STEP 600, and executes the machine instruction, STEP 620. The machine instruction includes, in one embodiment, an operation code to specify a compare and delay operation 602, one or more first fields (e.g., a register field) to be used to obtain a first operand 604, and one or more second fields (e.g., a base field, a first displacement field and a second displacement field) to be used to obtain a second operand located in a memory location 606. In one embodiment, the memory location is shared by the processor and another processor and/or an I/O subsystem, and the another processor or the I/O subsystem is to store the second operand. In a further embodiment, the machine instruction includes a mask field having a mask indicator 608. In one particular example, the mask field includes a first mask indicator for a comparison result of the first operand being equal to the second operand, a second mask indicator for a comparison result of the first operand being less than the second operand, and a third mask indicator for a comparison result of the first operand being greater than the second operand.

In one embodiment, the one or more first fields to be used to obtain the first operand include a register field, the register field including a designation of a register, and the register including the first operand 604. In a further embodiment, an address of the second operand in memory is provided by adding contents of a register specified in the based field to a concatenation of the second displacement field and the first displacement field, STEP 610.

Figure 6B:
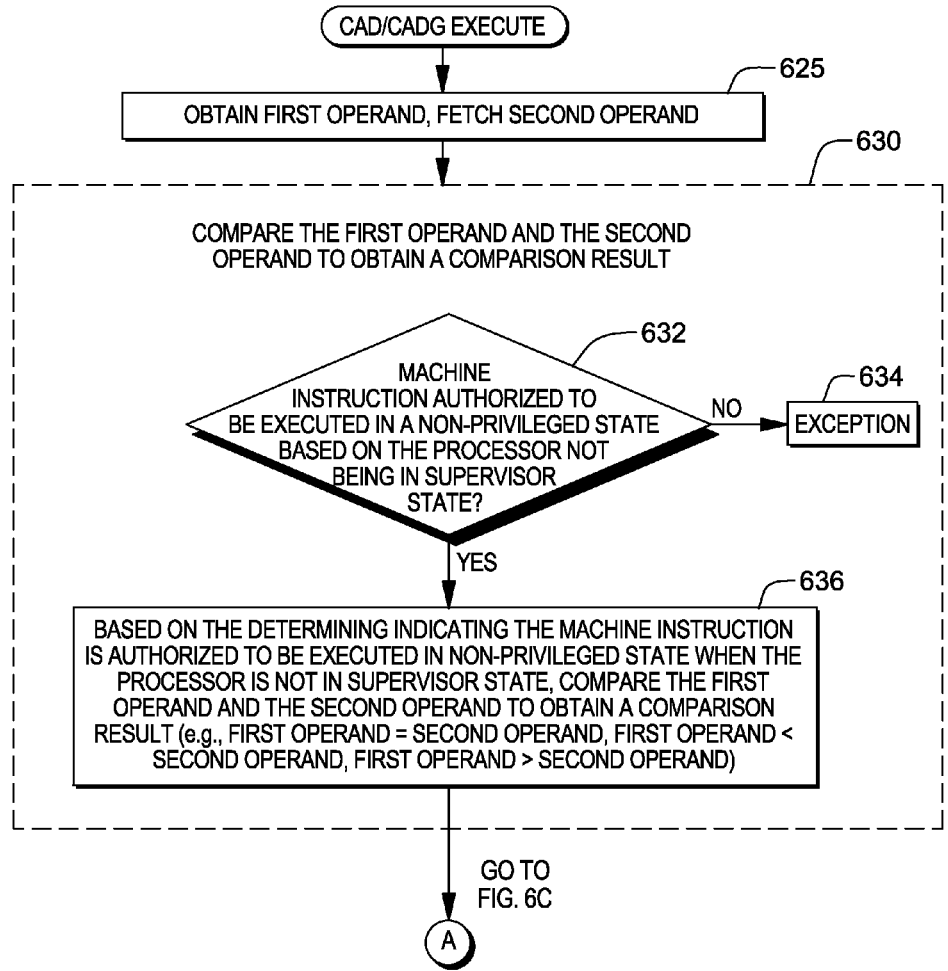

The executing of the machine instruction, by the processor, includes, in one embodiment, as shown in FIG. 6B, comparing the first operand and the second operand to obtain a comparison result, STEP 630. The first operand is obtained from the register and the second operand is fetched from memory, as examples, STEP 625. In one particular embodiment, initially, a determination is made as to whether the machine instruction is authorized to be executed in a non-privileged state based on the processor not being in the supervisor state, INQUIRY 632. Based on the determining indicating the machine instruction is authorized to be executed in a non-privileged state based on the processor not being in the supervisor state, the compare of the first operand and the second operand is performed, STEP 636. In one embodiment, if the machine instruction is not authorized, an exception is taken, STEP 634.

Figure 6C:
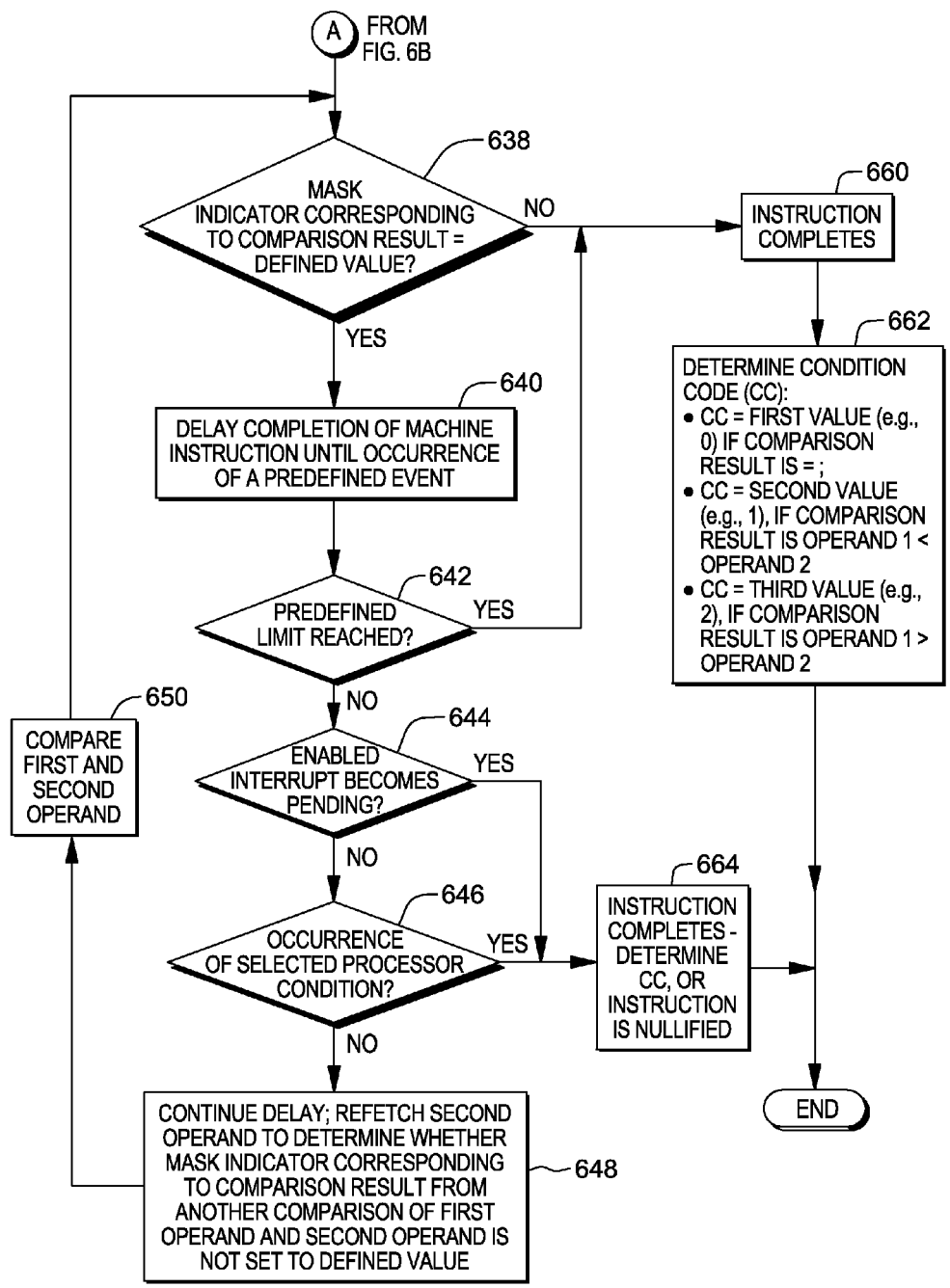

Thereafter, referring to FIG. 6C, a determination is made as to whether a mask indicator corresponding to the comparison result is set to a defined value, INQUIRY 638. Based on the mask indicator corresponding to a comparison result being equal to a defined value, INQUIRY 638, completion of the machine instruction is delayed until occurrence of a predefined event, STEP 640. During the delay, in, for instance, a multithreading environment, one or more other machine instructions or other programs of one or more other threads are able to execute.

As examples, the predefined event includes a predefined limit is reached, INQUIRY 642; an enabled interrupt is made pending, INQUIRY 644; an occurrence of a selected processor condition, INQUIRY 646; or determining that the mask indicator corresponding to the comparison result resulting from another comparison of the first operand and the second operand is not set to the defined value, STEP 648.

In one particular example, if the predefined limit is not reached, INQUIRY 642, an enabled interrupt is not made pending, INQUIRY 644, and a selected processor condition has not occurred, INQUIRY 646, then the delay continues. The second operand is re-fetched, STEP 648, and the first operand and second operand are compared, STEP 650. Processing continues at INQUIRY 638.

At INQUIRY 638, if the mask indicator corresponding to the comparison result does not equal the defined value, then the instruction completes (e.g., delay ends, if in delay), STEP 660, and a condition code is determined, STEP 662. In one embodiment, the condition code (CC) is equal to a first value (e.g., 0), if the comparison result is that the first operand is equal to the second operand. It is equal to a second value (e.g., 1), if the comparison result is that the first operand is less than the second operand, and it is equal to a third value (e.g., 2), if the comparison result is that the first operand is greater than the second operand.

Returning to INQUIRY 642, if the predefined limit is reached, processing continues to STEP 660, in which the instruction completes and the condition code is set, STEP 662.

Further, returning to INQUIRY 644, if an enabled interrupt becomes pending or a selected processor condition occurs, INQUIRY 646, either the instruction completes and a condition code is set, or the instruction is nullified, STEP 664.

As used herein, storage, central storage, main storage, memory and main memory are used interchangeably, unless otherwise noted, implicitly by usage or explicitly.

Figure 7:
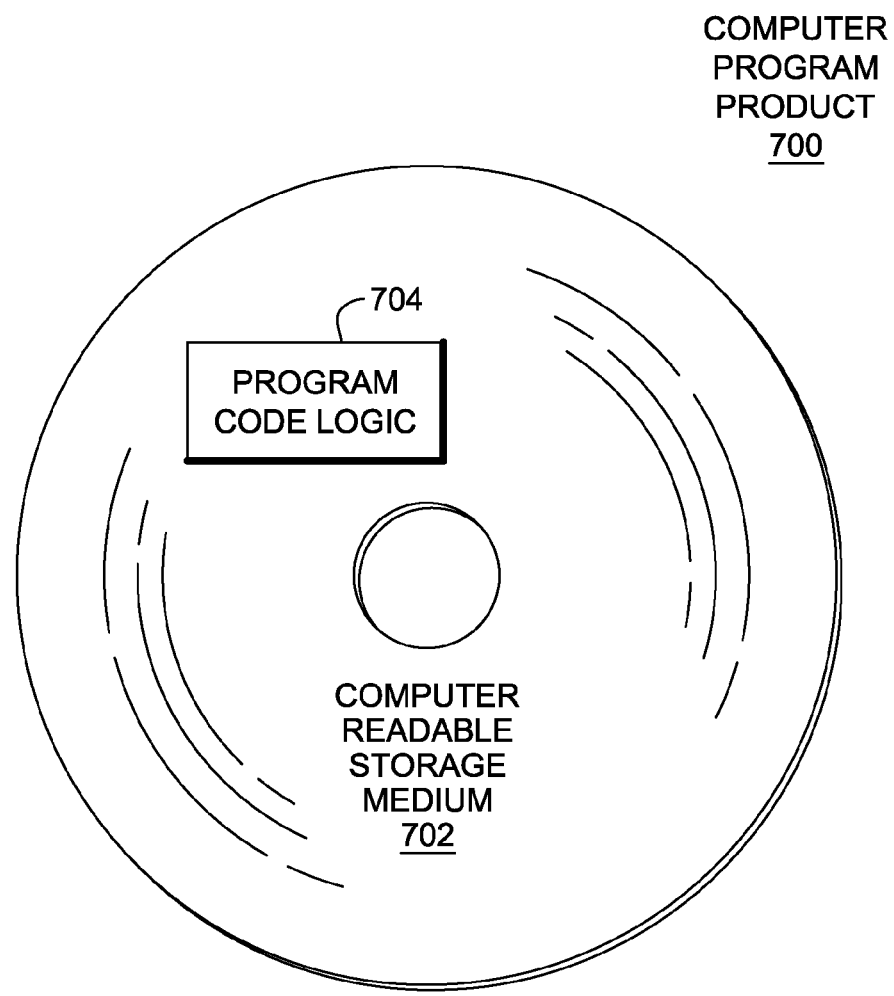
FIG. 7 depicts one embodiment of a computer program product.

Referring to FIG. 7, in one example, a computer program product 700 includes, for instance, one or more non-transitory computer readable storage media 702 to store computer readable program code means, logic and/or instructions 704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other limits may be provided and/or used in differing ways. In other examples, one or more of the operands being compared may not be specified in the instruction, but, e.g., be implied. In other embodiments, a uniprocessor program could execute a compare and delay instruction, and depending on the contents of the second operand (e.g., stored by the processor executing the program), either proceed immediately or delaying the instruction until, for instance, timeout or interruption. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 8:
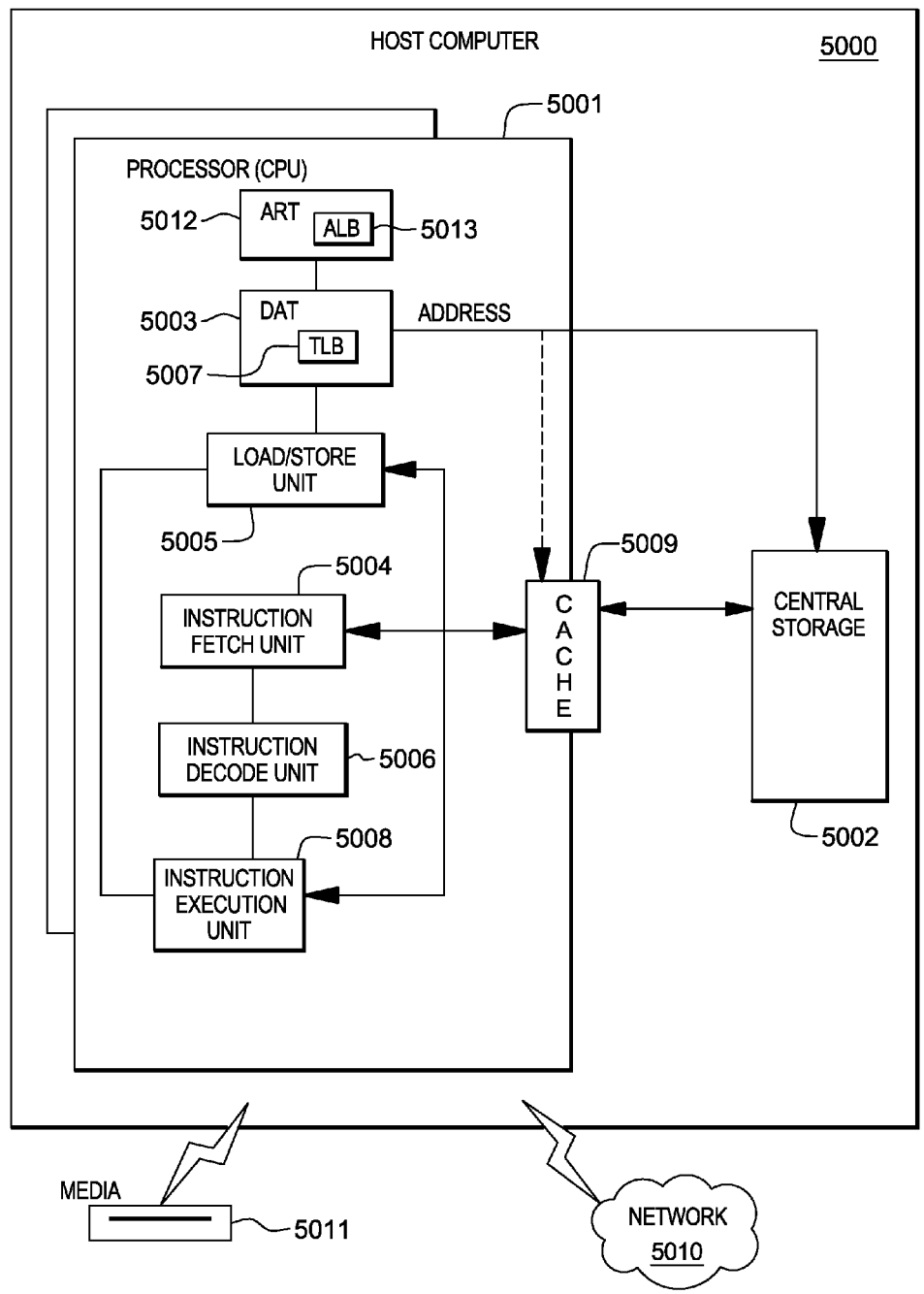
FIG. 8 depicts one embodiment of a host computer system.

Referring to FIG. 8, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 8, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 9:
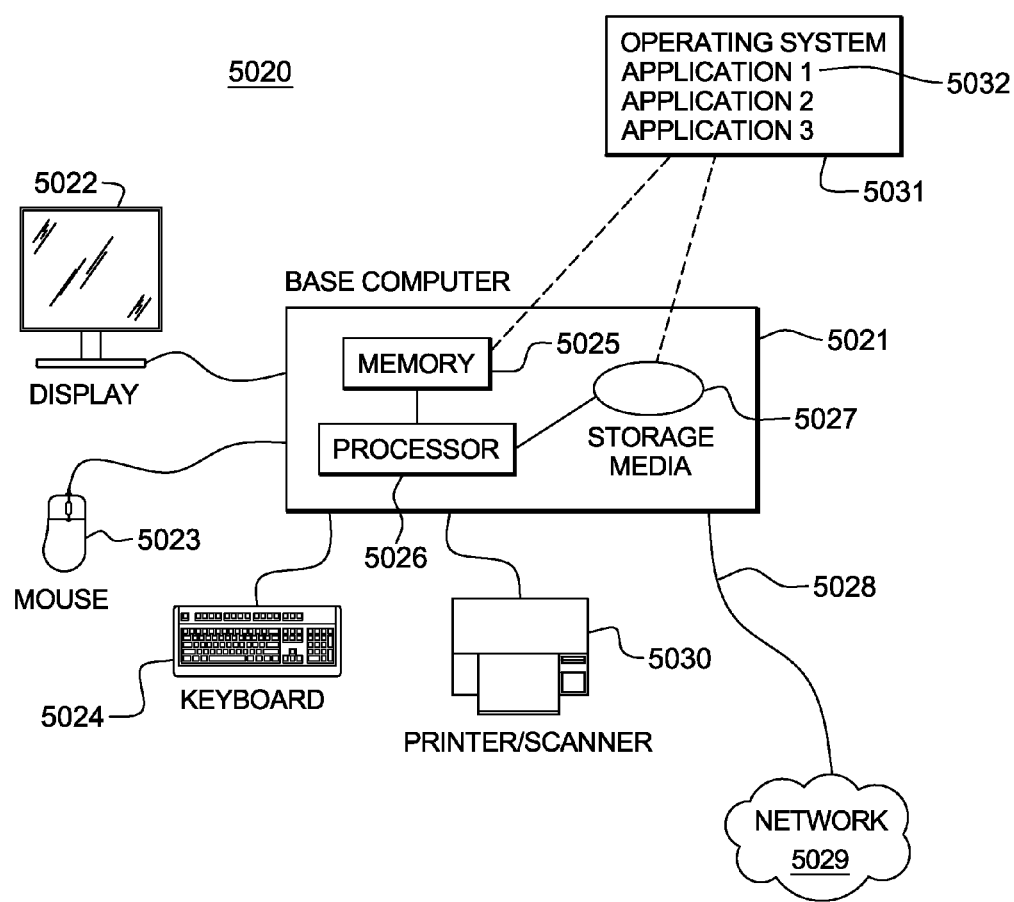
FIG. 9 depicts a further example of a computer system.

FIG. 9 illustrates a representative workstation or server hardware system in which one or more embodiments may be practiced. The system 5020 of FIG. 9 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 10:
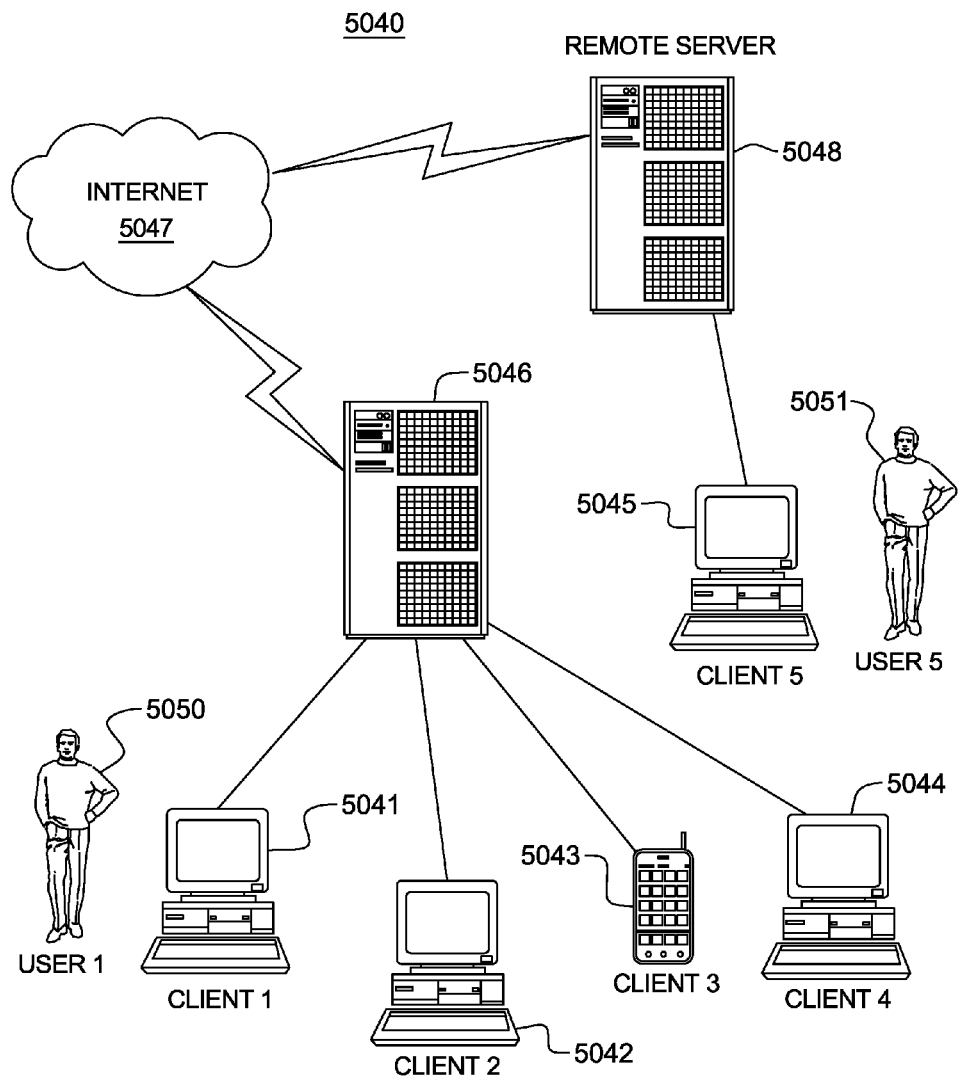
FIG. 10 depicts another example of a computer system comprising a computer network.

FIG. 10 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 10, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer System z server available from International Business Machines Corporation.

Referring concurrently to FIG. 9 and FIG. 10, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 11:
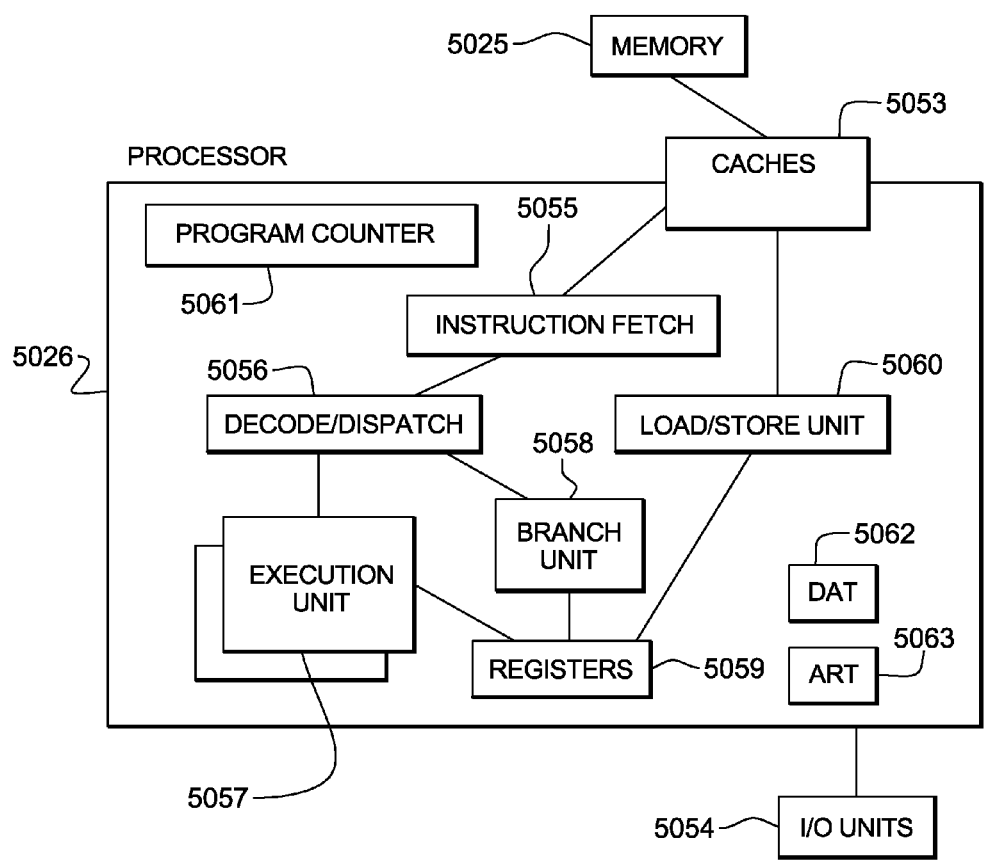
FIG. 11 depicts one embodiment of various elements of a computer system.

Referring to FIG. 11, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 12A:
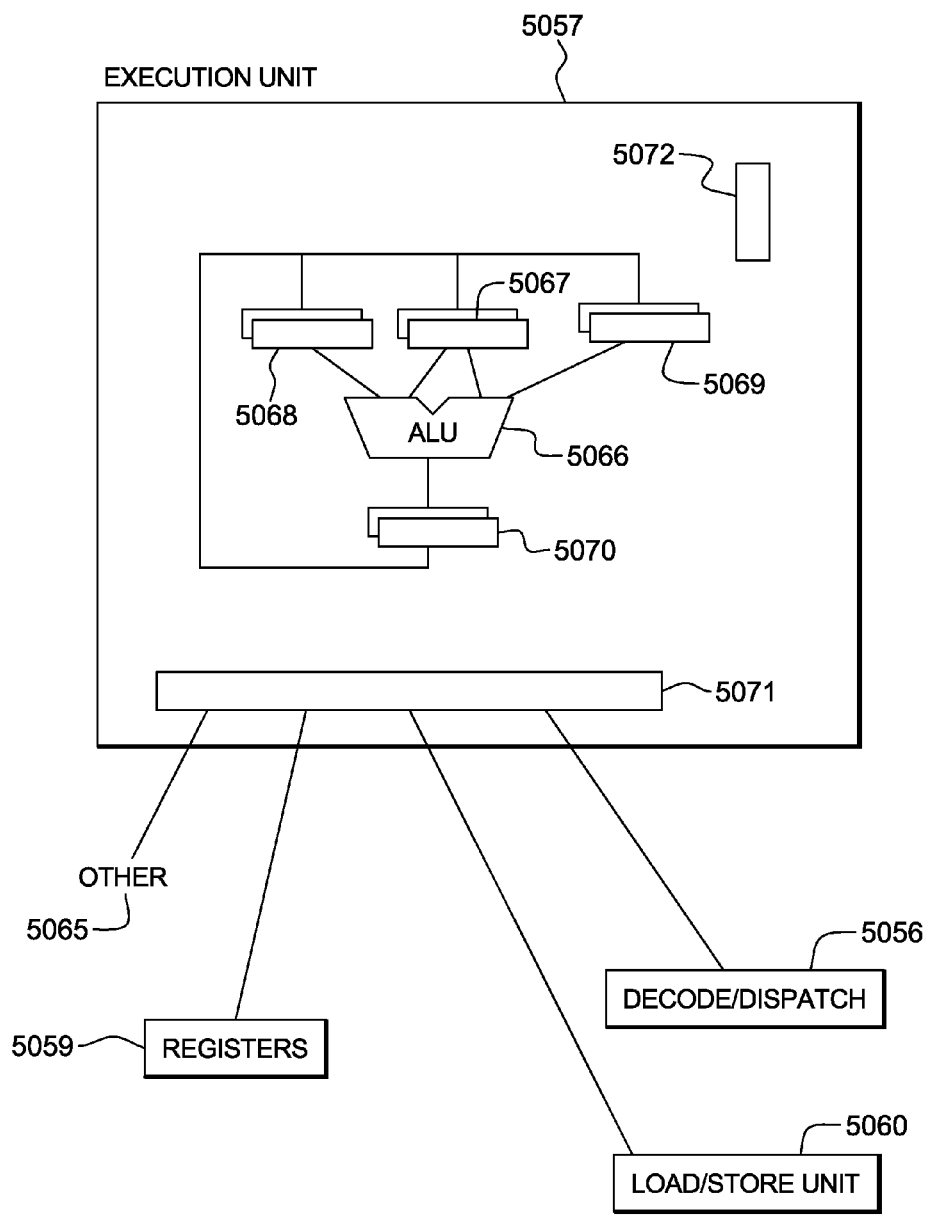
FIG. 12A depicts one embodiment of the execution unit of the computer system of FIG. 11.

A processor 5026 typically has one or more units 5057, 5058, 5060 for executing the function of the instruction. Referring to FIG. 12A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 12B:
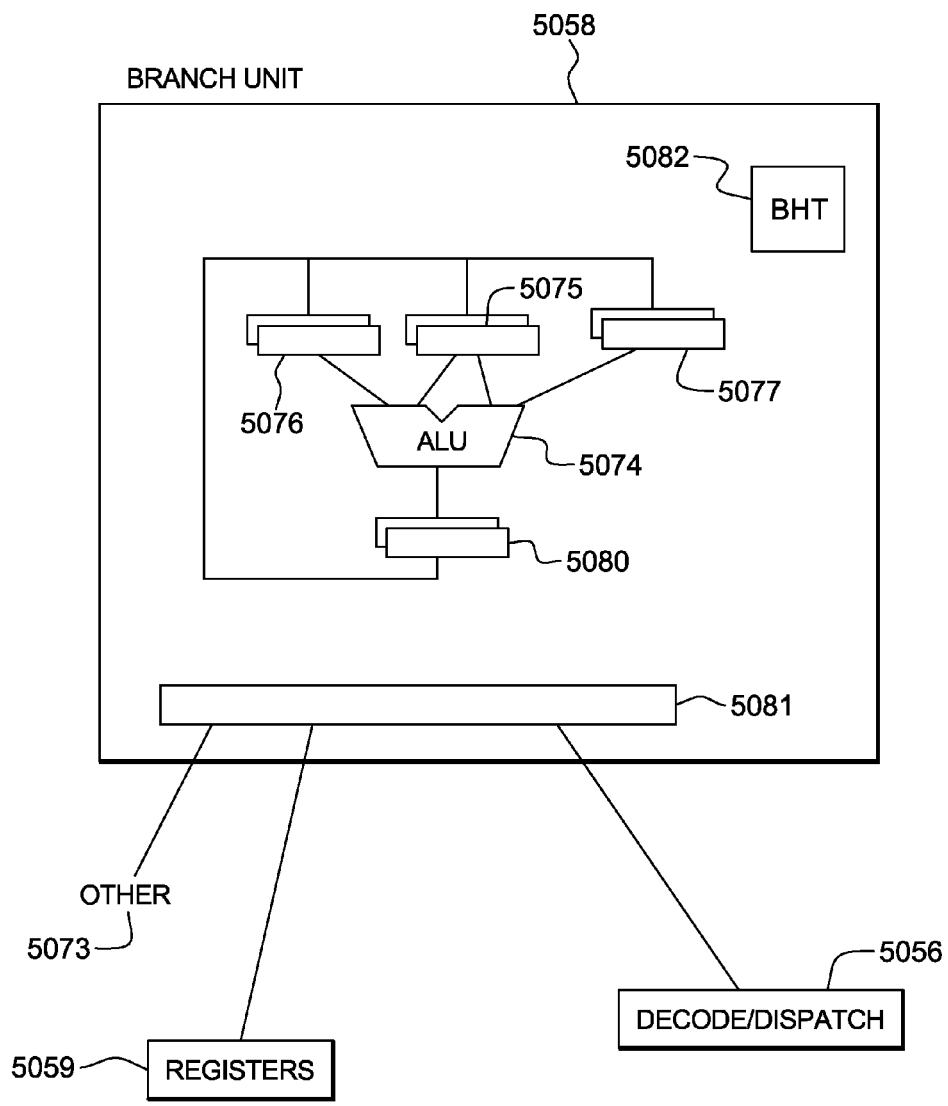
FIG. 12B depicts one embodiment of the branch unit of the computer system of FIG. 11.

Referring to FIG. 12B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 12C:
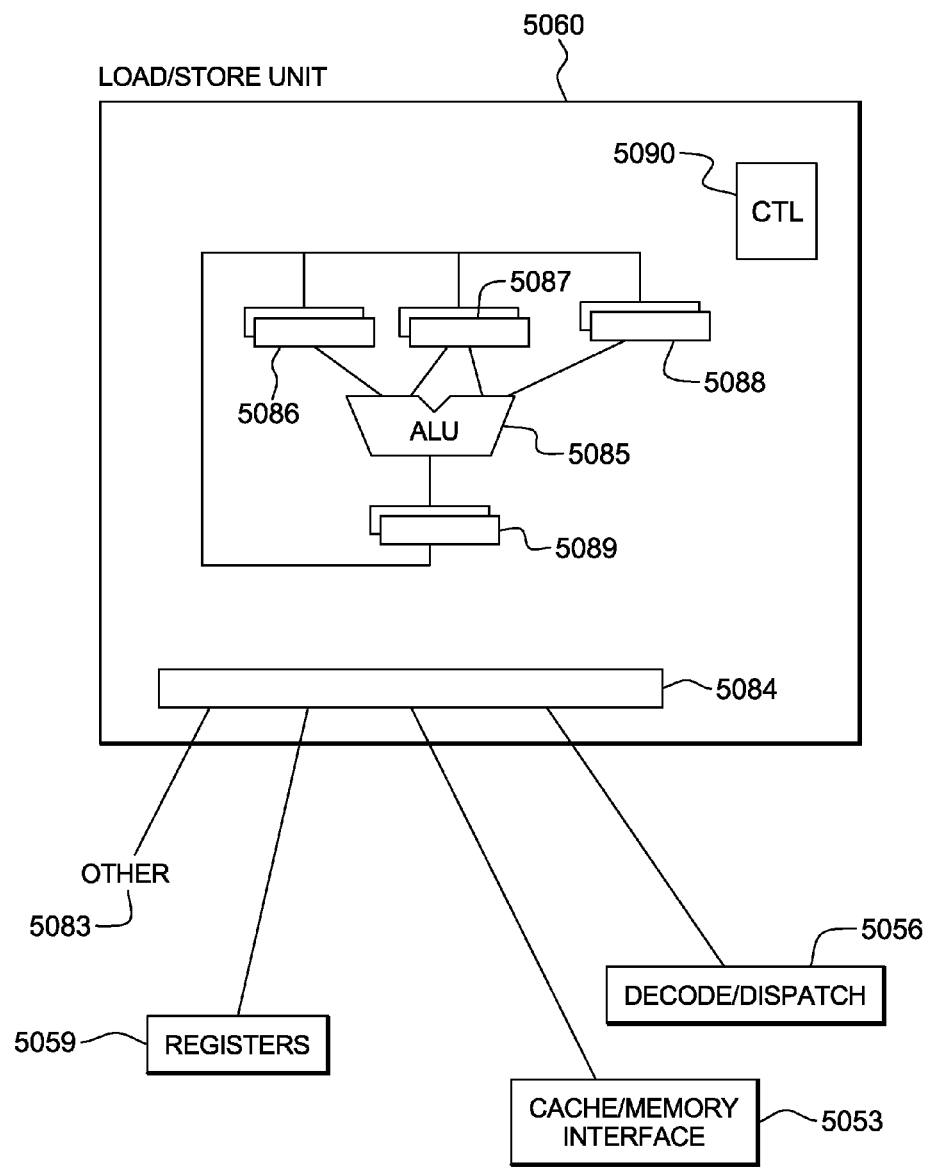
FIG. 12C depicts one embodiment of the load/store unit of the computer system of FIG. 11.

Referring to FIG. 12C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 11) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x Servers). They can be executed in machines running Linux on a wide variety of machines using hardware manufactured by IBM®, Intel®, AMD, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated by reference herein in its entirety; and many others, illustrate a variety of known ways to achieve emulation of an instruction format architected for a different machine for a target machine available to those skilled in the art.

Figure 13:
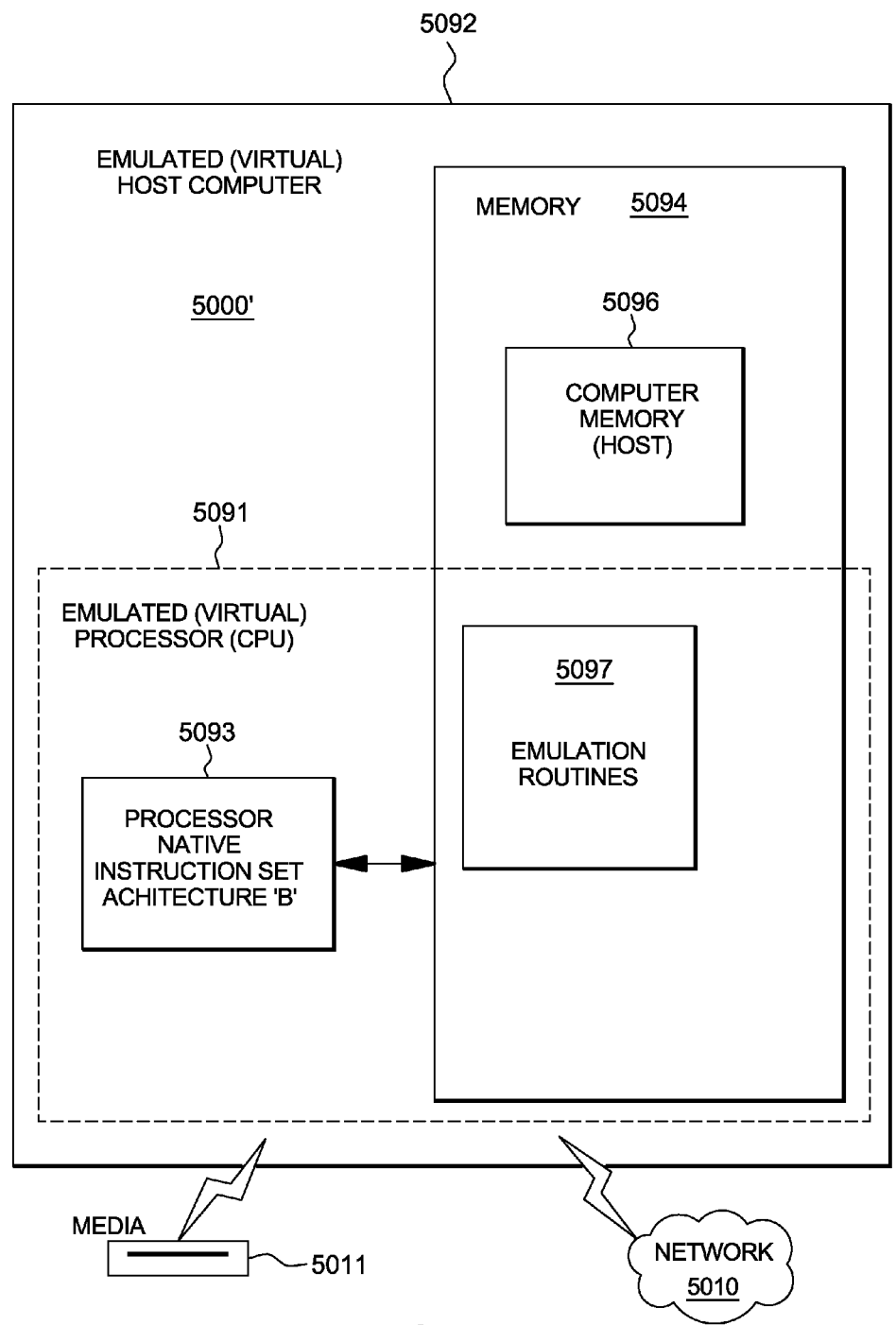
FIG. 13 depicts one embodiment of an emulated host computer system.

In FIG. 13, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 14:
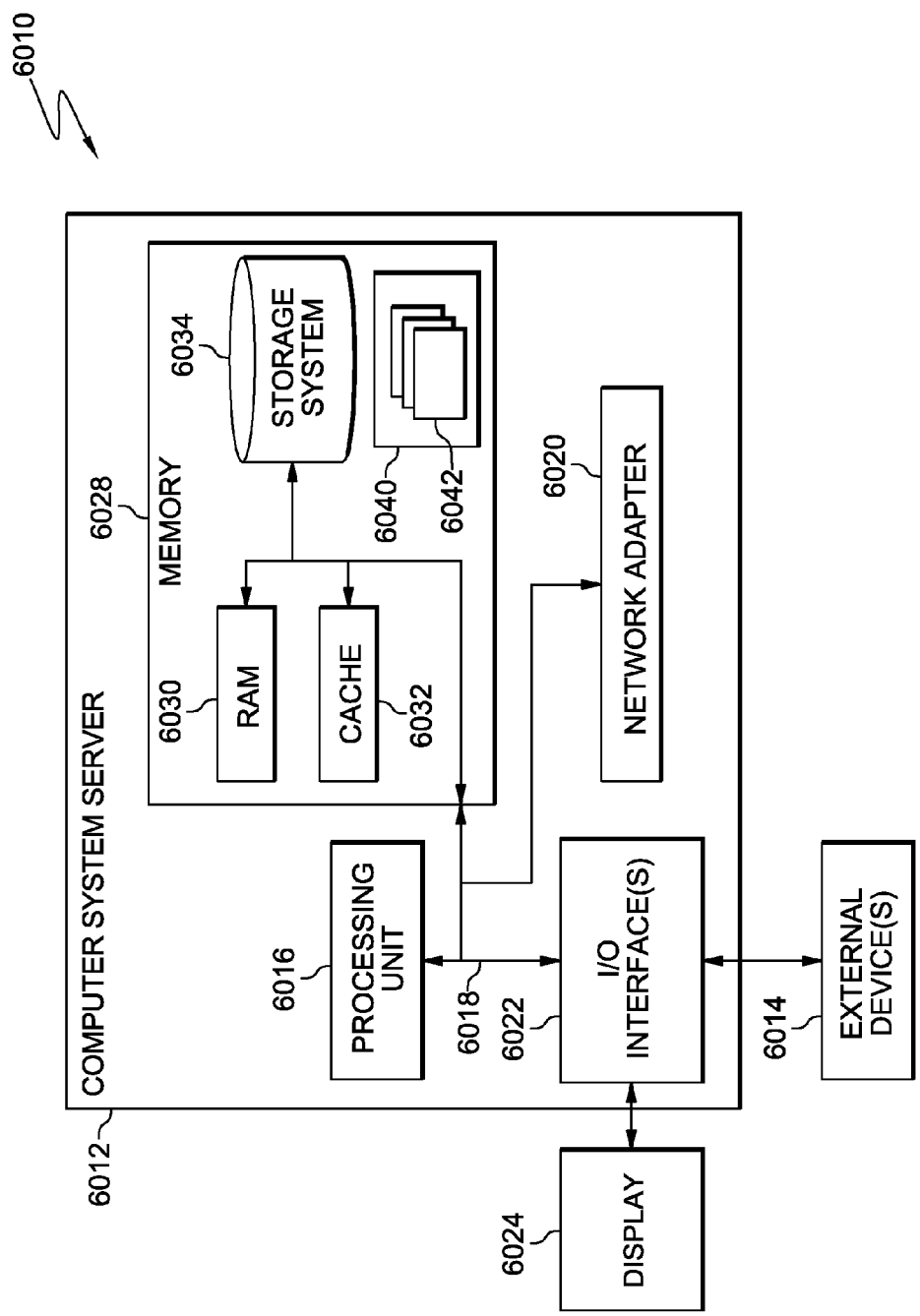
FIG. 14 depicts one embodiment of a cloud computing node.

Referring now to FIG. 14, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 15:
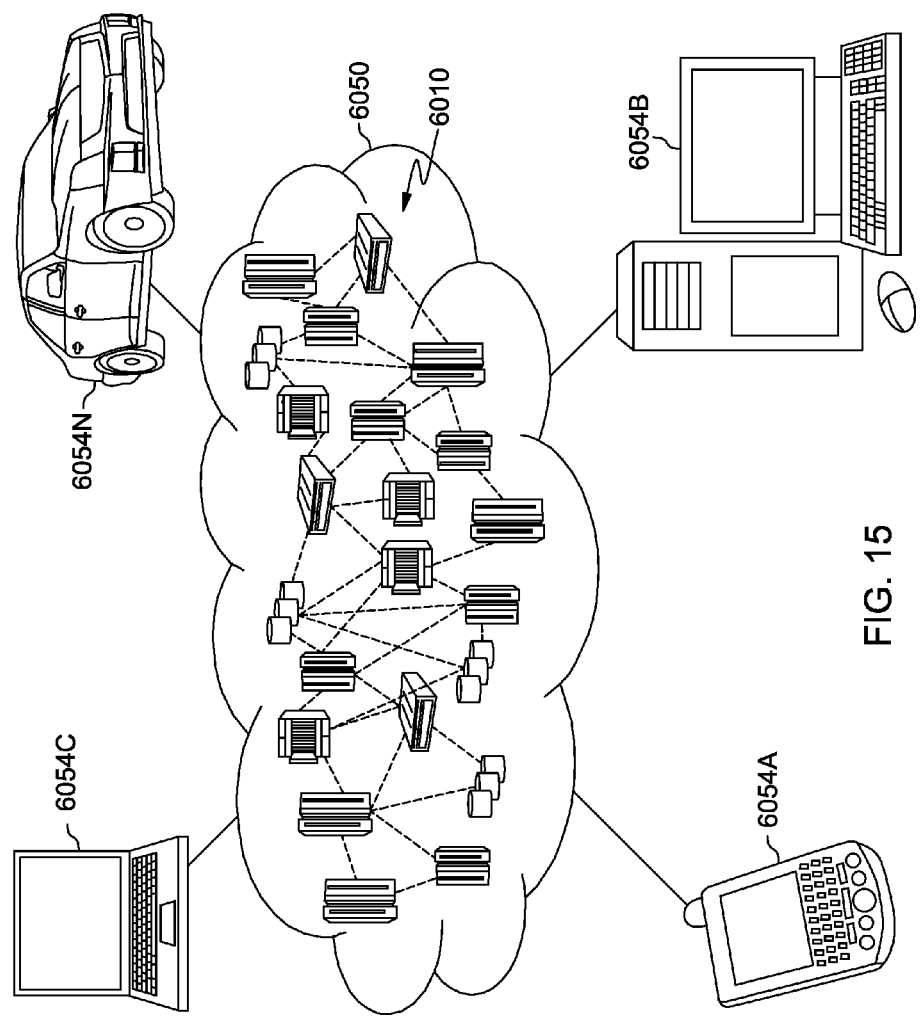
FIG. 15 depicts on embodiment of a cloud computing environment.

Referring now to FIG. 15, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 15 are intended to be illustrative only and that computing nodes 6010 and cloud computing environment 6050 can communicate with any type of computerized device over any type of network and/or network addressable connection (e.g., using a web browser).

Figure 16:
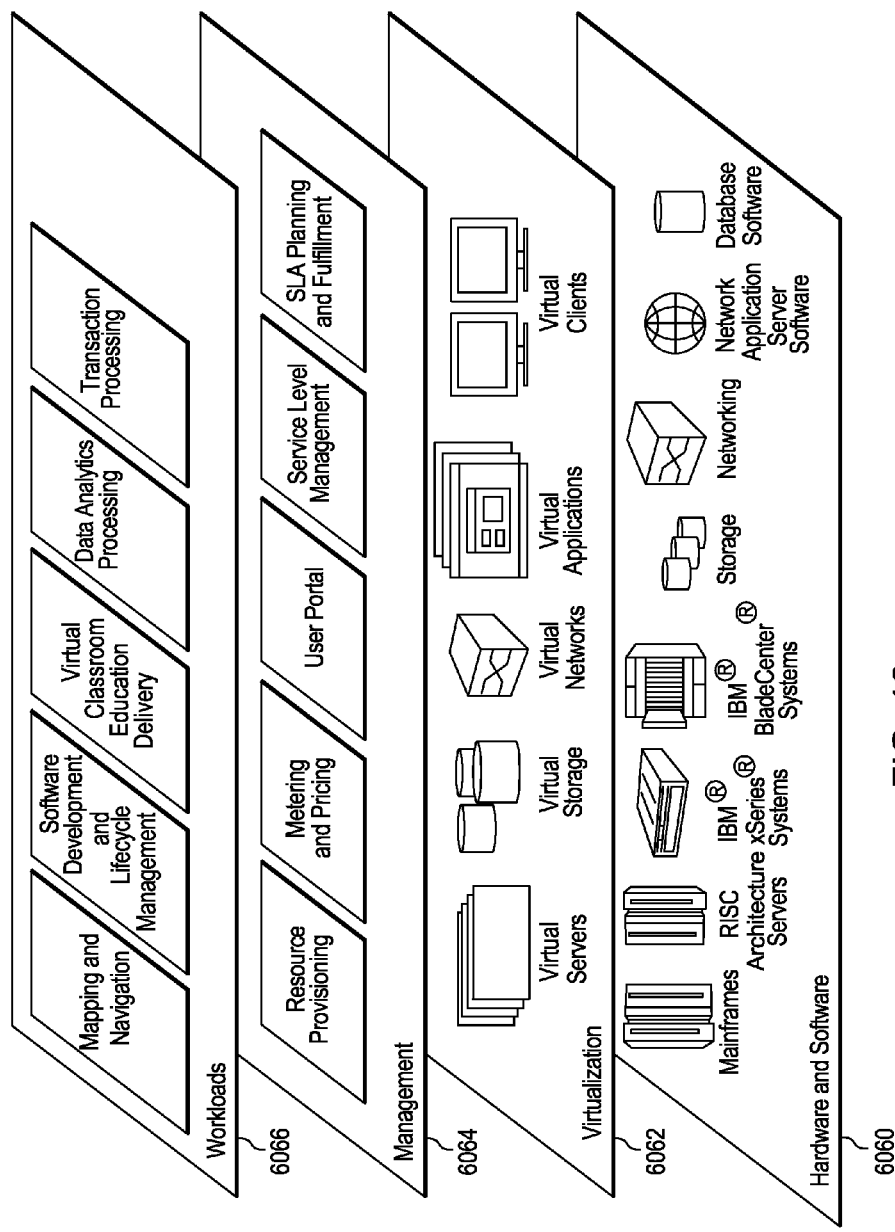
FIG. 16 depicts one example of abstraction model layers.

Referring now to FIG. 16, a set of functional abstraction layers provided by cloud computing environment 6050 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of executing a machine instruction in a multi-threaded computing environment, said method comprising: obtaining, by a thread of the multi-threaded computing environment, a compare and delay instruction for execution, the compare and delay instruction being defined for computer execution according to a computer architecture, the compare and delay instruction comprising: an operation code to specify a compare and delay operation; one or more first fields to be used to obtain a first operand; and one or more second fields to be used to obtain a second operand; and executing the compare and delay instruction on the thread of the multi-threaded computing environment, the executing the compare and delay instruction comprising: comparing the first operand and the second operand obtained using fields of the compare and delay instruction to obtain a comparison result, the second operand accessible by the thread and another thread of the multi-threaded computing environment; determining whether a mask indicator corresponding to the comparison result is set to a defined value; and based on determining that the mask indicator corresponding to the comparison result is set to the defined value, delaying completion of the compare and delay instruction that is executing until occurrence of a predefined event, wherein the delaying comprises repeating the comparing and the determining whether the mask indicator corresponding to the comparison result is set to the defined value, and wherein the delaying delays execution on the thread allowing progress to be made on the other thread to provide synchronization between the thread and the other thread.

2. The method of claim 1, wherein based on determining that the mask indicator corresponding to the comparison result is not set to the defined value, completing the compare and delay instruction.

3. The method of claim 1, wherein the one or more first fields to be used to obtain the first operand comprise a register field, the register field comprising a designation of a register, the register comprising the first operand, and wherein the one or more second fields to be used to obtain the second operand comprise a base field, a first displacement field and a second displacement field, wherein contents of a register specified in the base field are added to a concatenation of the second displacement field and the first displacement field to provide an address of the second operand in memory.

4. The method of claim 1, wherein the compare and delay instruction further comprises a mask field, the mask field comprising the mask indicator.

5. The method of claim 4, wherein the comparison result comprises one of equal, the first operand less than the second operand, or the first operand greater than the second operand, and wherein the mask field comprises the first mask indicator for equal, the second mask indicator for the first operand less than the second operand, and the third mask indicator for the first operand greater than the second operand.

6. The method of claim 1, wherein the second operand is monitored during the delaying completion of the compare and delay instruction, and wherein the predefined event comprises determining that the mask indicator corresponding to the comparison result resulting from another comparison of the first operand and the second operand is not set to the defined value.

7. The method of claim 1, wherein the predefined event comprises an enabled interruption is made pending.

8. The method of claim 1, wherein the predefined event comprises reaching a predefined limit or occurrence of a selected processor condition.

9. The method of claim 1, wherein the second operand is located in a memory location shared by the thread and the other thread, the second operand stored by the other thread or an input/output subsystem of the multi-threaded computing environment.

10. The method of claim 1, further comprising determining whether the compare and delay instruction is authorized to be executed in a non-privileged state, and performing the comparing the first operand and the second operand based on the determining indicating the compare and delay instruction is authorized to be executed in the non-privileged state.

11. The method of claim 1, further comprising determining a condition code for the compare and delay instruction, the determining the condition code using the comparison result, wherein for a comparison result of equal, the condition code is a first value; for a comparison result of the first operand less than the second operand, the condition code is a second value; and for a comparison result of the first operand greater than the second operand, the condition code is a third value.

* * * * *